(12) United States Patent
Kamm et al.

(10) Patent No.: US 9,598,113 B2
(45) Date of Patent: Mar. 21, 2017

(54) VEHICLE BODY ARRANGEMENT FOR A VEHICLE FRONT PART

(71) Applicant: Dr. Ing. h.c. F. Porsche Aktiengesellschaft, Stuttgart (DE)

(72) Inventors: Martin Kamm, Niefern-Oeschelbronn (DE); Nino Andricevic, Stuttgart (DE); Robert Gudopp, Stuttgart (DE); Andreas Patzelt, Troisdorf (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 14/944,275

(22) Filed: Nov. 18, 2015

(65) Prior Publication Data

US 2016/0144901 A1 May 26, 2016

(30) Foreign Application Priority Data

Nov. 20, 2014 (DE) .................. 10 2014 117 004

(51) Int. Cl.
*B62D 21/00* (2006.01)
*B62D 25/08* (2006.01)

(52) U.S. Cl.
CPC .................. *B62D 25/085* (2013.01)

(58) Field of Classification Search
CPC ........ B62D 23/00; B62D 25/00; B62D 25/08; B62D 25/20
USPC ................... 180/311, 312; 280/784
See application file for complete search history.

(56) References Cited

U.S. PATENT DOCUMENTS

| 5,921,578 | A | * | 7/1999 | Sekita | ............... B60G 3/14 280/781 |
|---|---|---|---|---|---|
| 6,099,039 | A | * | 8/2000 | Hine | ............... B60G 11/181 180/311 |
| 6,206,461 | B1 | | 3/2001 | Gaiser | |
| 8,585,066 | B2 | * | 11/2013 | Young | ............... B62D 21/155 280/124.109 |
| 2006/0181071 | A1 | * | 8/2006 | Mitsui | ............... B62D 21/155 280/784 |
| 2011/0240397 | A1 | * | 10/2011 | Shiina | ............... B62K 5/01 180/312 |

(Continued)

FOREIGN PATENT DOCUMENTS

DE 297 04 093 10/1997
DE 198 29 432 1/2000

(Continued)

OTHER PUBLICATIONS

German Search Report of Jul. 2, 2015.

*Primary Examiner* — Toan To
(74) *Attorney, Agent, or Firm* — Gerald E. Hespos; Michael J. Porco; Matthew T. Hespos

(57) ABSTRACT

A vehicle body arrangement for a vehicle front part (6) has at least a first load path plane (8, 10, 12). The vehicle front part (6) has at least two longitudinal carriers (22, 24) and at least two transverse elements (18, 20) that connect the longitudinal carriers (22, 24). At least the rear transverse element (20), as viewed in the driving direction, is configured as a crossmember, as viewed in the load direction. The rear transverse element (20) is adjoined by an assembly carrier (36) with a motor vehicle assembly (38). The motor vehicle assembly (38) has at least one assembly longitudinal carrier (40, 42).

9 Claims, 2 Drawing Sheets

(56) References Cited

U.S. PATENT DOCUMENTS

| | | | |
|---|---|---|---|
| 2012/0248822 A1 | 10/2012 | Mildner et al. | |
| 2013/0270808 A1* | 10/2013 | Young | B62D 21/155 280/784 |
| 2013/0320710 A1* | 12/2013 | Watanabe | B62D 25/082 296/187.09 |
| 2015/0021115 A1* | 1/2015 | Komiya | B62D 21/155 180/312 |

FOREIGN PATENT DOCUMENTS

| | | |
|---|---|---|
| DE | 198 56 980 | 6/2000 |
| DE | 10 2004 061 707 | 7/2006 |
| DE | 10 2007 060 482 | 6/2009 |
| DE | 10 2011 015 541 | 10/2012 |

* cited by examiner

VEHICLE BODY ARRANGEMENT FOR A VEHICLE FRONT PART

CROSS REFERENCE TO RELATED APPLICATION

This application claims priority under 35 USC 119 to German Patent Appl. No. 10 2014 117 004.0 filed on Nov. 20, 2014, the entire disclosure of which is incorporated herein by reference.

BACKGROUND

1. Field of the Invention

The invention relates to a vehicle body arrangement for a vehicle front part having at least one load path. The vehicle front part has at least two longitudinal carriers and at least two transverse elements that connect the longitudinal carriers. At least the rear transverse element is a crossmember.

2. Description of the Related Art

Vehicle body arrangements of the type described above are known from the prior art. For instance, DE 10 2004 061 707 A1 describes a vehicle body arrangement, in which a load path is formed by two longitudinal carriers. The longitudinal carriers in one exemplary embodiment are connected by three transverse elements that are configured as crossmembers. In other exemplary embodiments, further longitudinal struts or diagonal struts are arranged in the intermediate space of the longitudinal carriers to increase the rigidity of the vehicle front part. Additional struts of this type increase costs for material and assembly. Moreover, struts of this type can adversely affect efforts to optimize the installation space.

It is therefore an object of the invention to provide a vehicle body arrangement that avoids the abovementioned disadvantages.

SUMMARY

This object is achieved by having the rear transverse element, as viewed in the load direction, adjoined by an assembly carrier with a motor vehicle. The motor vehicle assembly has at least one assembly longitudinal carrier. Assembly and material outlay can be reduced by having an assembly carrier incorporated into the load path. An optimization of the installation space is also possible in this simple way.

The motor vehicle assembly may be an electric motor that can be served by the at least one longitudinal carrier, as a holding element. Furthermore, the assembly carrier may be configured as a chassis subframe.

Two assembly longitudinal carriers may be provided and may act laterally on the motor vehicle assembly. As a result, optimum force transmission with simultaneous mounting of the motor vehicle assembly takes place.

In one embodiment, a first load path plane is configured as a lower load path plane, and at least a second upper load path plane is provided. In the case of a crash, the force advantageously is transmitted by the assembly longitudinal carrier into the vehicle floor or into the vehicle tunnel. To increase the rigidity of the vehicle even further, two diagonal carriers and a further longitudinal carrier can be arranged between the transverse elements. The front transverse element may be a panel element.

In the following text, the invention will be explained in greater detail.

DETAILED DESCRIPTION

Figure 1:
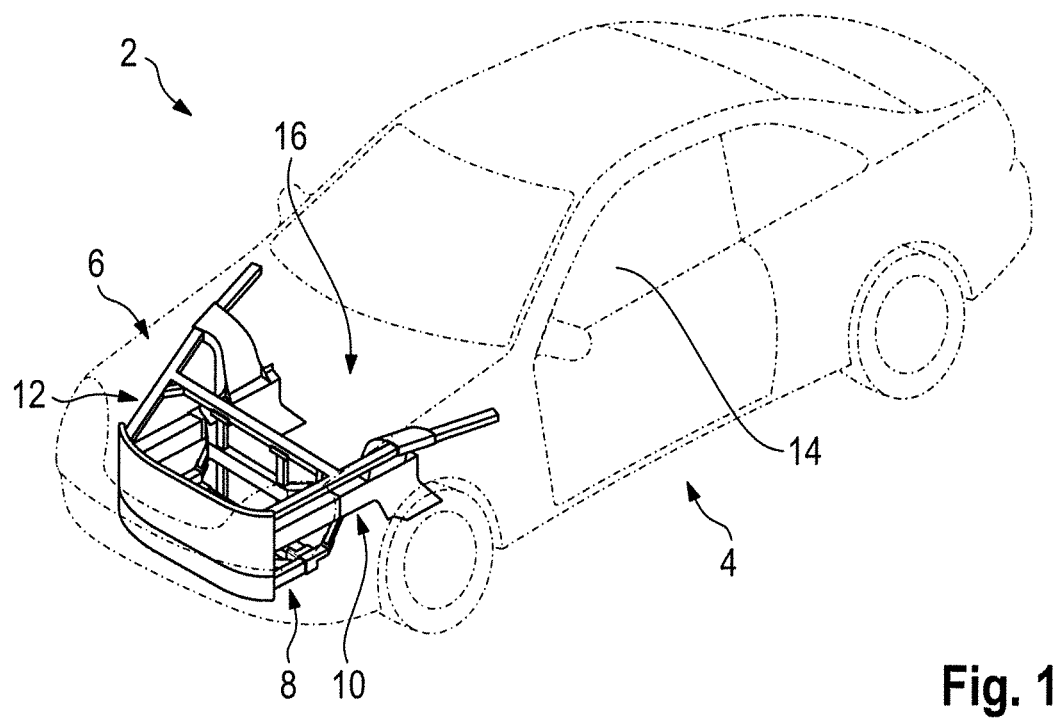
FIG. 1 is a perspective view of a vehicle body arrangement of a motor vehicle.

FIG. 1 is a perspective view of a vehicle body arrangement 2 of a motor vehicle 4 having a vehicle front part 6. The vehicle front part 6 has a lower load path plane 8, a middle load path plane 10 and an upper load path plane 12. In the case of a crash, said load path planes are intended to ensure an optimum introduction of force into the vehicle body arrangement 2 in the case of a frontal crash, thereby avoiding deformations of a passenger cabin 14 and the engine compartment 16.

Figure 2:
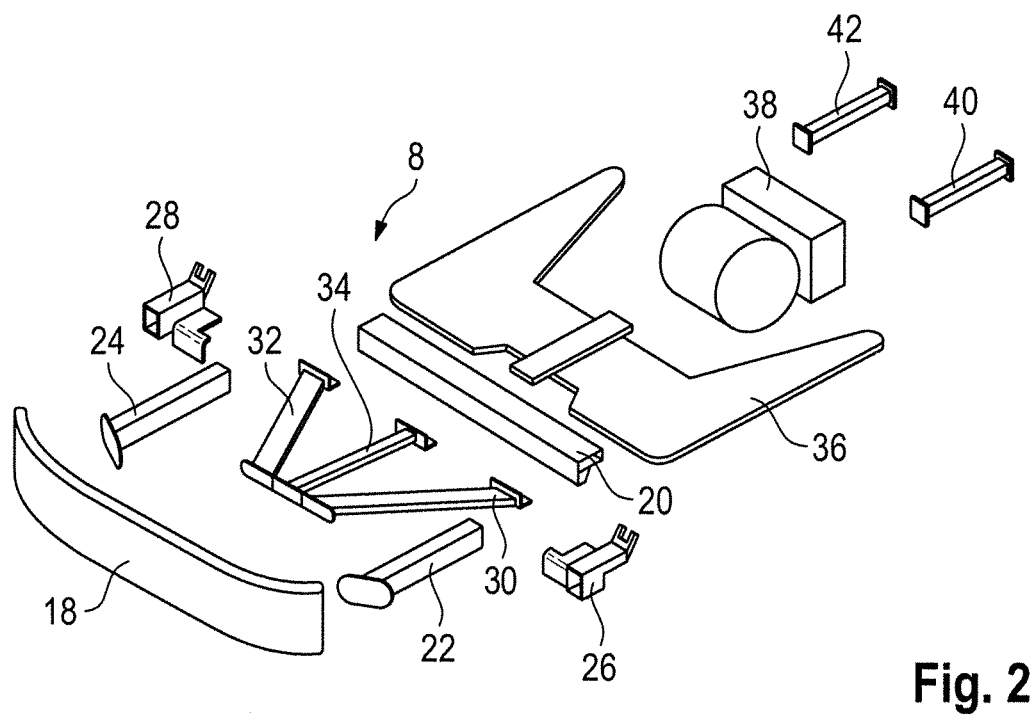
FIG. 2 is an exploded perspective view of a lower load path plane of a vehicle front part of the vehicle body arrangement of FIG. 1.

FIG. 2 is an perspective exploded view of the vehicle body arrangement 2 in the region of the vehicle front part 6 and illustrates the lower or first load path plane 8. The lower load path plane 8 has a first front (as viewed in the driving direction) transverse element 18 that is configured as a panel element. Furthermore, a second, rear (as viewed in the driving direction) transverse element 20 is provided and is configured as a crossmember. The panel element 18 and the crossmember 20 are connected by way of two longitudinal carriers 22, 24. The connection of the crossmember 20 to the longitudinal carriers 22 and 24 being produced by cast node elements 26, 28. In the present case, two diagonal struts 30, 32 and a longitudinal strut 34 are also provided between the transverse elements 18, 20 for further reinforcement. As viewed in the load direction, the crossmember 20 is adjoined by an assembly carrier 36 having a motor vehicle assembly 38, an electric motor here. The assembly carrier is configured as a chassis subframe in the present exemplary embodiment. The electric motor 38 has two laterally running assembly longitudinal carriers 40, 42 which, in the case of a crash, transmit the force into a vehicle floor or vehicle tunnel (not shown in further detail) of the motor vehicle 4.

Figure 3:
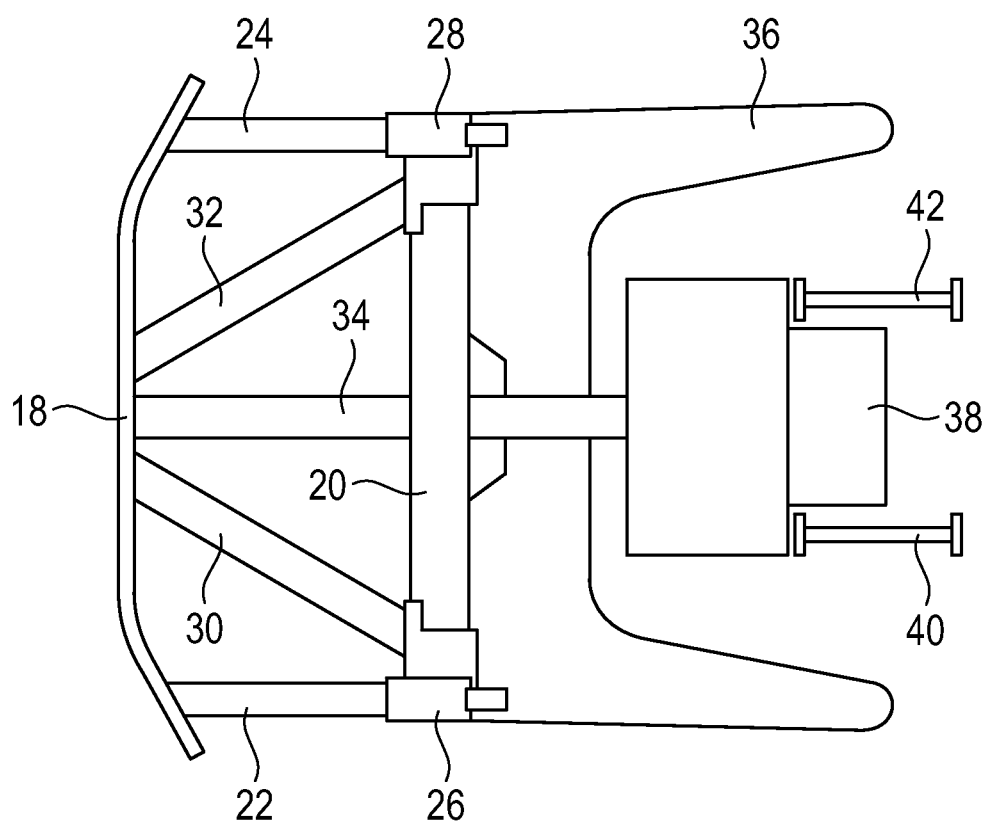
FIG. 3 shows a plan view of the lower load path plane from FIG. 2.

FIG. 3 shows the lower load plane 8 of the vehicle front part 6 in a plan view in the assembled state. The cast nodes 26, 28 also serve here to fasten the assembly carrier 36. The electric motor 38 is fastened centrally to the assembly carrier 36. The assembly longitudinal carriers 40, 42 transmit substantially the force that is introduced by way of the longitudinal strut 34 into the electric motor 38 into a vehicle tunnel or vehicle floor (not shown in further detail).

What is claimed is:

1. A vehicle body arrangement for a vehicle front part having at least a first substantially horizontal load path plane, the load path plane having at least left and right longitudinal carriers and at least front and rear transverse elements that connect the left and right longitudinal carriers, the rear transverse element being configured as a crossmember and having a rear side adjoined by a substantially plate-shaped assembly carrier, the vehicle front part further having a motor assembly rearward of at least part of the assembly carrier, left and right assembly longitudinal carriers spaced laterally from one another and extending rearward from the motor assembly.

2. The vehicle body arrangement of claim 1, wherein the motor assembly is an electric motor.

3. The vehicle body arrangement of claim 1, wherein the assembly carrier is a chassis subframe.

4. The vehicle body arrangement of claim 1, wherein the first load path plane is a lower load path plane, the vehicle body arrangement further having at least a second load path plane higher than the first load plane.

5. The vehicle body arrangement of claim 1, wherein the load path plane further comprises left and right diagonal carriers and a central longitudinal carrier are arranged between the transverse elements.

6. The vehicle body arrangement of claim 1, wherein the front transverse element is a panel.

7. The vehicle body arrangement of claim 5, wherein the central longitudinal carrier extends from a substantially central lateral position on the front transverse element to a substantially central lateral position on the rear transverse element.

8. The vehicle body arrangement of claim 7, wherein the left and right diagonal carriers extend from positions on the front transverse element on opposite respective left and right sides of the central longitudinal carrier to positions substantially adjacent respective left and right lateral ends of the rear transverse element.

9. The vehicle body arrangement of claim 1, wherein the substantially plate-shaped assembly carrier has a central portion forward of the motor assembly and left and right portions extending to opposite left and right lateral sides of the motor assembly.

* * * * *